US012798543B2

(12) United States Patent
Toth et al.

(10) Patent No.: US 12,798,543 B2
(45) Date of Patent: Nov. 17, 2026

(54) SENSOR TEST SYSTEM

(71) Applicant: Knorr-Bremse Systeme Fuer Nutzfahrzeuge GmbH, Munich (DE)

(72) Inventors: Zoltan Toth, Budapest (HU); Gabor Toth, Budaörs (HU); Bence Nyizsnyik, Budapest (HU); Oliver Udvardy, Budapest (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 223 days.

(21) Appl. No.: 18/264,750

(22) PCT Filed: Feb. 9, 2022

(86) PCT No.: PCT/EP2022/053173

§ 371 (c)(1),
(2) Date: Aug. 8, 2023

(87) PCT Pub. No.: WO2022/184396

PCT Pub. Date: Sep. 9, 2022

(65) Prior Publication Data

US 2024/0051512 A1 Feb. 15, 2024

(30) Foreign Application Priority Data

Mar. 5, 2021 (EP) .................................... 21160866

(51) Int. Cl.
*B60T 17/22* (2006.01)
*B60T 15/02* (2006.01)
*G01L 27/00* (2006.01)

(52) U.S. Cl.
CPC ............ *B60T 17/221* (2013.01); *B60T 15/02* (2013.01); *G01L 27/007* (2013.01); *B60T 2270/406* (2013.01); *B60T 2270/88* (2013.01)

(58) Field of Classification Search
CPC .. B60T 17/221; B60T 15/02; B60T 2270/406; B60T 2270/88; B60T 2270/413; G01L 27/007
See application file for complete search history.

(56) References Cited

U.S. PATENT DOCUMENTS 8,087,732 B2 * 1/2012 Averbeck .............. B60T 8/4072 303/122.09
9,709,044 B2 7/2017 Kalbeck et al.
(Continued)

FOREIGN PATENT DOCUMENTS

DE 19633835 A1 * 2/1998 ................ B60T 8/00
DE 10110060 A1 9/2001
(Continued)

OTHER PUBLICATIONS

International Search Report for PCT/EP2022/053173, Issued May 17, 2022.

*Primary Examiner* — Hitesh Patel
*Assistant Examiner* — Jason Nguyen
(74) *Attorney, Agent, or Firm* — NORTON ROSE FULBRIGHT US LLP

(57) ABSTRACT

A sensor test system for a pressure sensor in an electronic parking brake (EPB) of a vehicle. The pressure sensor is configured to measure a pressure in a pressure chamber or in a pressure line of the EPB. The sensor test system includes a pressure setting module configured to set the pressure; and by a detection module configured to detect, based on pressure set by the pressure setting module and based on a measured pressure from the pressure sensor, a potential malfunction of the pressure sensor, and to issue a warning signal if the potential malfunction is detected.

28 Claims, 3 Drawing Sheets

(56) References Cited

U.S. PATENT DOCUMENTS

| | | | | |
|---|---|---|---|---|
| 11,313,103 B2 * | 4/2022 | Mizutani | ................. | E02F 9/226 |
| 2011/0144855 A1 * | 6/2011 | Herges | .................... | B60T 8/327<br>701/29.1 |
| 2021/0094526 A1 * | 4/2021 | Yamaguchi | .............. | B60Q 9/00 |

FOREIGN PATENT DOCUMENTS

| | | | | |
|---|---|---|---|---|
| DE | 102008024661 A1 | 11/2009 | | |
| DE | 102010015502 A1 * | 10/2011 | ............ | B60T 13/683 |

* cited by examiner

SENSOR TEST SYSTEM

FIELD OF THE INVENTION

The present invention relates to a sensor test system for a pressure sensor, a method for testing a pressure sensor, and in particular to a pressure sensor plausibility check for pneumatic brakes.

BACKGROUND INFORMATION

In motor vehicles, brake units, in particular electronic parking brakes (EPB), comprise pressure sensors for measuring a pressure for a brake. In a typical architecture of an EPB, there is only one pressure sensor for the EPB pressure chamber. In situations where the brake is indicated to be failing—as e.g. if non-successful parking is detected—one potential cause is the failure of the pressure sensor. Although this cause cannot be distinguished from other potential root causes, it is usually acknowledged in the state of the art that it is safer to assume the failure of the pressure sensor, which makes the EPB system inoperable. This must often be considered to be only a worst-case assumption, as the actual cause for the failure of the brake may be unrelated to the pressure sensor. If it could be reliably detected that the problem does not lie with the pressure sensor, it might still be possible to operate the system, and thereby the vehicle, in a restricted mode. Unnecessary towing of the vehicle to a workshop could be avoided.

In the state of the art, one solution to the problem of recognizing the cause of a brake failure is to use multiple sensors, whose individual indications can serve as a mutual control. An automated system may e.g. be configured to take a democratic approach to detect a pressure sensor failure, and for instance check a plausibility of a pressure sensor failure by a 2 out of 3 voting. However, besides the cost for the additional devices, an installation of further pressure sensors including the necessary wiring is often unfeasible due to strong restriction of available space in a brake unit.

Another approach is discussed in U.S. Pat. No. 9,709,044 for the special case of a brake booster. There, pressure sensor functionality is validated by a change of the sensor signal. More precisely, a plausibility check of the pressure sensor signal is carried out by determining an amplitude of a sinusoidal pressure wave, following a stroke of a pump. The amplitude is compared to a stored comparison value. The variation of the signal is continuous, and the measurement is actually rather indirectly related to an actual operation or operability of the sensor and of the brake.

SUMMARY OF THE INVENTION

There remains, in particular, a demand for a test system adapted for a pressure sensor of a parking brake. At least some of the problems of the described conventional approaches are overcome by a sensor test system as described herein, a brake unit as described herein, a vehicle as described herein, a method as described herein, and a computer program product as described herein. The dependent claims refer to further advantageous realizations of the subject matter of the independent claims.

The present invention relates to a sensor test system for a pressure sensor in an electronic parking brake, EPB, of a vehicle. The pressure sensor is configured to measure a pressure in a pressure chamber or in a pressure line of the EPB. The sensor test system comprises a pressure setting module, configured to set the pressure. It also comprises a detection module, configured to detect, based on pressure set by the pressure setting module and based on a pressure measured by the pressure sensor, a potential malfunction of the pressure sensor. The detection module is configured to issue a warning signal if the potential malfunction is detected.

Here, the pressure may in particular be a pressure of air. It is emphasized that although the most advantageous application of the sensor test system is within an EPB, the system may also be configured for a pressure sensor in any other parking or even service brake, and also in a brake booster.

A pressure chamber of an EPB is under pressure if the brake is in a released state, and the pressure is lowered in order to apply the brake. Generically, a parking brake function may only require two pressure states (full release or full application of the brake). However, parking brake units in the state of the art are often configured to hold the pressure chamber (or the pressure line) under several fixed values of the pressure. This has e.g. the advantage that the parking brake can be employed as a backup for the—otherwise independent—service brake. The pressure chamber or line may, however, also be configured to operate in a continuous range of pressures.

In the case of a brake booster, a vacuum, or a pressure below that of an environment, is built up in order to increase a brake force. If the present sensor test system is configured for a pressure sensor of a brake booster, the following description should be read with appropriate adaptations, in order to take the different modes of operation into account.

In all cases, the detection of a failure of the pressure sensor is based on a deliberate change of the pressure in a pressure chamber or line of the brake unit, and on a corresponding reaction of the pressure sensor. In embodiments of the presented test system, the pressure is thus intentionally increased and decreased in a controlled way, and the actually measured pressure is compared to the expected pressure value. This is contrary to the systems in the state of the art as described above.

It is understood that the sensor test system may be partially or fully integrated into another electronic control unit of the vehicle or of the brake unit. Similarly, the pressure setting module and the detection module may be partially or fully integrated into each other, or share common functions and data. In particular, functions ascribed to one of the two modules may, in some embodiments, be in fact performed by the respective other module.

Optionally, the pressure setting module is configured to set the pressure if the vehicle is at standstill. In such a situation, another system on the vehicle, tasked with the detection of an unsuccessful parking brake application, will usually base its result on a signal from the pressure sensor. However, due to a failure of the pressure sensor the measured pressure value may not reflect the actual pressure. Normally if the pressure has not passed a certain limit the parking brake application will be considered to be incomplete. However, even if the pressure sensor indicates a pressure at or exceeding the limit, this may still be caused by the pressure sensor being stuck at the corresponding pressure value.

In order to detect such failures, the present sensor test system may be configured to deliberately open appropriate valves to e.g. increase and then decrease the pressure in the corresponding pressure chamber. If the measured pressure is in sufficient correlation with the expected change, the sensor is considered to be operating well.

Optionally the vehicle comprises a further brake, and the pressure setting module is configured to apply the further brake, and/or to receive a signal indicating an actuation of the further brake, and/or to check that the further brake is applied, while setting the pressure for the brake. This becomes particularly important if the test is about to release or weaken the pressure of an applied parking brake. If a system on the vehicle detects e.g. a successful parking, the pressure may then be raised to a full release of the brake, in which case the expected pressure will be at least close to a supply pressure for the brake. Since the supply pressure value is typically known, this allows a direct comparison of the pressure sensor output to this known value. The further brake may be located in a different brake unit, but it may also be a service brake of the same unit providing the parking brake whose pressure sensor is being tested. Information about a status of the further brake may e.g. be retrieved from an anti-lock braking system (ABS), an electronic stability program (ESP), or another higher braking system.

Optionally the pressure setting module is configured to set the pressure for the brake in one or more of the following ways: to a value which is proportional to, i.e. below, a value for releasing the EPB (or, respectively, a brake actuator of the EPB), and/or to more than one value in a predetermined sequence, and/or to more than one value in a continuous way with a specific gradient, and/or to a sequence of values in a periodic way.

The sensor test system may in particular be configured to perform a sequence of pressure increases and decreases (or vice versa) according to some predefined schedule. For example, a first boost of change of the pressure may attain a pressure value far below a threshold to change the current status of the brake, in order not interfere immediately with a driving or parking maneuver of the vehicle.

Optionally, the pressure setting module is configured to set the pressure for the brake depending on a parking and/or driving status of the vehicle. In particular, a test of the pressure sensor may be performed if the vehicle is at standstill, with the parking brake applied, and a signal for a release of the parking brake is received. In such a situation, the pressure setting module may first set a sequence of lower pressure values, before finally releasing the brake. Other parking and/or driving states include e.g. situations where the brake is not fully applied or released, and in particular e.g. during gradient start (starting on a hill) or if the vehicle runs in a hill descent control mode. Depending on the status, the pressure setting module may be configured to apply or release the brake fully, or only to a smaller extent (which may in particular be insufficient to initiate or suppress an actual braking of the vehicle), in order to interfere only minimally with a control of the vehicle. The parking and/or driving status may be indicated to the pressure setting module by a control signal from a different component of the vehicle, or from a driver.

Optionally the EPB comprises a plurality of valves for setting the pressure, and the pressure setting module is configured to set the pressure by one or more particular valves of the plurality of valves.

Optionally, the detection module is configured to trigger the pressure setting module to set a pressure. In this way, the detection module may make the order of the valve opening, timing and desired pressure dependent on the actual output of the pressure sensor. Further factors may also be taken into account. The triggering of the pressure setting module may depend on the precise way in which the detection module detects the pressure sensor malfunction.

Optionally, the detection module is configured to detect a potential malfunction of the pressure sensor based on one or more of the following:

- a nominal output of the pressure sensor,
- a recorded previous output of the pressure sensor,
- a brake supply pressure,
- a vehicle weight,
- a driving or parking status of the vehicle,
- a force exerted by the brake e.g. on a wheel of the vehicle,
- a motion and/or movement of the brake,
- a temperature,
- an air humidity.

A recorded previous output of the pressure sensor may advantageously be employed to influence the way in which the pressure setting module continues to set the pressure. The output may also be employed to adapt the setting of pressure values based on other data in the above list.

The vehicle weight may be obtained from another system on the vehicle, from an estimation, or preset when the sensor testing system is installed. If the vehicle has a higher weight, stricter margins for keeping e.g. a parking brake applied during the test may be necessary.

The detection module may be configured to receive data about a brake force and/or a movement of the brake, or of the vehicle, in order to judge if the brake is properly applied or properly released.

Air temperature and/or humidity may be employed to take into account a dependence of the pressure sensor on the environmental conditions. Temperature and humidity may also be taken into account in order to define parameters for a pressure sensor test sequence, especially if the environmental conditions are likely to impact the functionality of the brake system, such as in very hot or very cold weather.

Optionally, the detection module is configured to issue the warning signal to a driver, to surroundings of the vehicle, and/or to a further component of the vehicle. The driver or people in the surroundings may be warned e.g. by an acoustic and/or optical signal. The further component of the vehicle may in particular be a planning module of an autonomous driving system, and the signal may be adapted to support the autonomous driving system in operating the vehicle in a restricted mode.

Embodiments further relate to a brake unit comprising a pressure chamber or a pressure line, a pressure sensor configured to measure a pressure in the pressure chamber or pressure line, and a sensor test system for the pressure sensor, according to the above description.

The testing system may in particular be adapted for an EPB, but also for a completely pneumatic parking brake, a service brake, or a brake booster.

Embodiments further relate to a vehicle comprising a brake unit with a testing system as described.

Embodiments further relate to a method for testing a pressure sensor in a brake unit of a vehicle. The pressure sensor is configured to measure a pressure in a pressure chamber or in a pressure line of the brake unit, which may in particular be an EPB. The method comprises the steps:

- setting the pressure;
- measuring, by the pressure sensor, the pressure;
- detecting, based on the set pressure and on the measured pressure, a potential malfunction of the pressure sensor; and
- issuing a warning signal if the potential malfunction is detected.

This method may also be implemented in software on a computer program product. Embodiments of the present invention may, in particular, be implemented by software or a software module in an electronic control unit. Therefore, embodiments relate also to a computer program product having a program code for performing the method if the program code is executed on a processor.

Some embodiments of the system and method will be described in the following by way of examples only, and with respect to the accompanying figures.

BRIEF DESCRIPTIONS OF THE DRAWINGS

Figure 3:
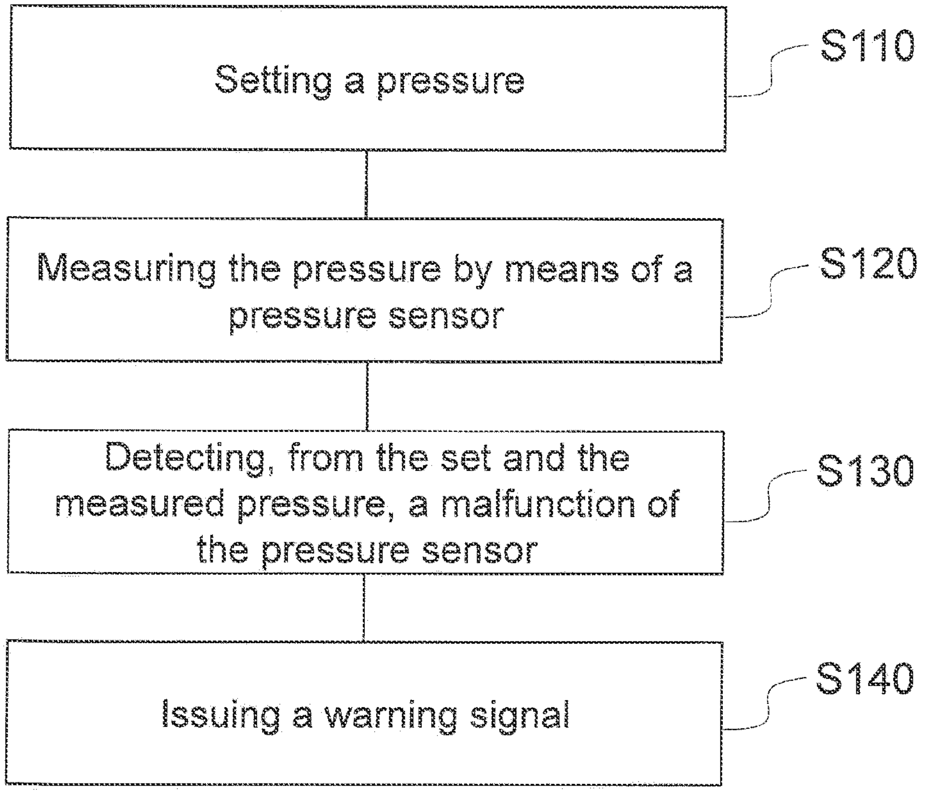

FIG. 3 displays steps of a method for testing a pressure sensor.

DETAILED DESCRIPTION

Figure 1:
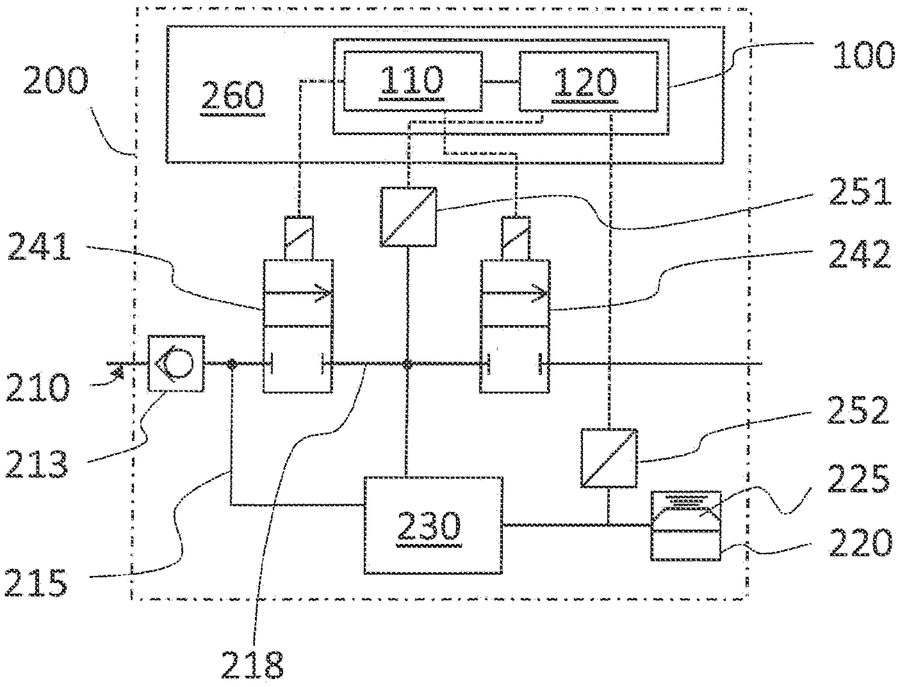
FIG. 1 illustrates an embodiment of the sensor test system in an electronic parking brake.

FIG. 1 illustrates an embodiment of the sensor test system 100 together with some parts of an exemplary electronic parking brake, EPB, 200 of a vehicle. The EPB 200 exhibits a pressure supply connection 210, equipped with a check valve 213, to receive pressurized air for a pressure chamber 225 of a spring brake actuator 220. In the present example, the pressurized air is provided to the pressure chamber 225 by a supply line 215 via a parking brake relay valve, PBRV, 230. The PBRV 230 is configured to set a plurality of different pressure values in the pressure chamber 225. In order to control the pressure in the pressure chamber 225, two control valves 241, 242 operate the PBRV 230 by regulating pressure through a control line 218. The diagram displays two pressure sensors: a first pressure sensor 251 is configured to measure a pressure in the control line 218, and a second pressure sensor 252 is configured to measure a pressure in the pressure chamber 225. The control valves 241, 242 and the pressure sensors 251, 252 are operated by an electronic control unit, ECU, 260 of the EPB 200. In this embodiment, the sensor test system is a part of the ECU 260. In the ECU 260, only the sensor test system 100 and some (dashed) electric lines connecting to it are displayed in this diagram, but it is understood that further modules of the ECU 260 may exist to control the EPB 200. The sensor test system 100 comprises a pressure setting module 110, configured, in this embodiment, to set both a pressure in the control line 218 as well as a pressure in the pressure chamber 225, by the control valves 241, 242. The sensor test system 100 furthermore comprises a detection module 120 which is configured to detect, based on pressure set by the pressure setting module 110, and based on a measured pressure from the pressure sensors 251, 252, a potential malfunction of the pressure sensors 251, 252. The detection module 120 is further configured to issue a warning signal if the potential malfunction is detected. The pressure setting module 110 or the detection module 120 may exhibit data communication connections to other components of the vehicle, in particular to other brake units.

In this embodiment, the sensor test system 100 is configured to deliberately open the first control valve 241 and the second control valve 242 individually, in particular in order to increase and then decrease the pressure in the pressure chamber 225. If the measured pressure in the pressure chamber 225 is in correlation with the expected change, the second pressure sensor 252 is considered to be adequately operational. The order of the opening of the control valves 241, 242, a timing, and the desired pressure change depend primarily on the actual output of the respective pressure sensor 251, 252. However, other factors, such as e.g. vehicle data or previous pressure sensor outputs during actuations, might also be taken into account.

Regarding a test schedule, a simple two-way change of the pressure may be applied. This may be followed by more sophisticated modulations (e.g. a pressure change with a certain gradient, or a periodic change of the pressure). By these methods, a status of the pressure sensor 252 can be determined more precisely.

The sensor test system 100 may be configured to perform similar tests also for the first pressure sensor 251, both together with the tests of the second pressure sensor, or individually.

During a variation of the pressure 252 in the pressure chamber 225, the vehicle may have to be prevented from moving. This may be achieved either by only applying a limited variation of the pressure in the pressure chamber 225 (leading only to a small change in a brake force), or by constantly applying another brake of the vehicle. The other brake may e.g. be a service brake provided by the same brake actuator, or it may be located in a different brake unit. The application of the other brake may be performed either by the driver, or by the sensor test system 100 in an automatic way.

Figure 2:
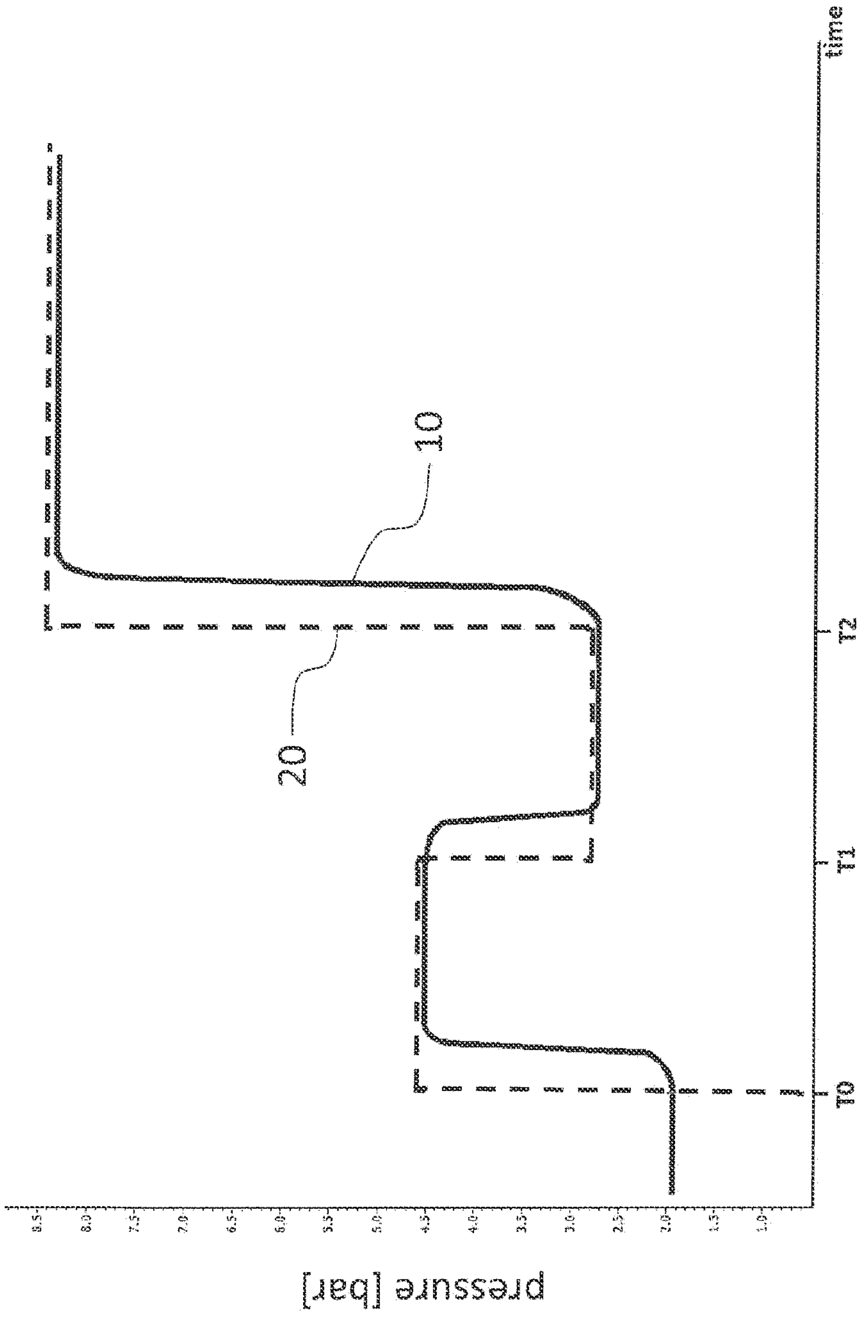
FIG. 2 illustrates an operation of the sensor test system.

FIG. 2 illustrates the operation of the sensor test system 100 by a curve of pressure versus time in a pressure chamber 225 of a brake 220. The diagram displays a curve of pressure sensor data 10, and a sequence of pressure demand values 20 set by the pressure setting module 110.

The vehicle may initially be at standstill, i.e. before a time T0, the parking brake 220 may be applied, such that the pressure in the pressure chamber 225 is low, with the pressure sensor 252 reporting a pressure of about 2 bar. At time T0, the pressure setting module 110 sets a pressure of about 4.5 bar, which is reflected—with a time lag—in the pressure sensor data 10. At time T1, the pressure setting module 110 sets a lower pressure of about 3 bar in the pressure chamber 225, which is again measured in due time by the pressure sensor 252. At time T2, the pressure setting module 110 increases the target pressure to 8.5 bar, which may release the brake 220. Again, the pressure sensor 252 indicates that the set pressure is attained in the pressure chamber 225 shortly afterwards.

This example may e.g. occur in a situation where the vehicle is about to drive off. At time TO, a signal for releasing the parking brake 220 may reach the EPB 200, prompting the sensor test system 100 to initiate the test of the pressure sensor 252. The first two pressure values set by the pressure setting module 110—in this case, 4.5 bar and 3 bar—may be well below a threshold pressure necessary to release the parking brake 220. Eventually, after the check in this relatively limited pressure range, the pressure in the pressure chamber 225 is set to 8.5 bar, which may be enough for releasing the brake 220.

The test may also be performed shortly after the vehicle has been parked, and e.g. after another system has declared that the vehicle has performed a successful parking. Also in this case, the pressure may be raised to a full release of the brake 220 (before the parking brake is eventually applied again). The full release has the advantage that the expected pressure is close to the supply pressure. Since the supply pressure is typically known, this provides an additional cross-check for the functionality of the pressure sensor 252. In this case, however, it is especially important to avoid the movement of the vehicle.

The test of the pressure sensor 252 may also be performed in parking situations other than those just described. It may also extend, with suitable adaptations, to a test of a service brake or a brake booster. Furthermore, even though the present description only relates to tests for a pressure sensor, the concept may be extended to other sensors as well.

FIG. 3 displays steps of a method for testing a pressure sensor 251, 252 in a brake unit 200 of a vehicle. The pressure sensor 251, 252 is configured to measure a pressure in a pressure chamber 225 or in a pressure line 218 of the brake unit 200. The method comprises a step of setting S110 the pressure in the pressure chamber 225 or pressure line 218. A further step comprises measuring S120, by the pressure sensor 251, 252, the pressure. The method further comprises detecting S130, based on the set pressure and based on the measured pressure, a potential malfunction of the pressure sensor 251, 252. A further step of the method comprises issuing S140 a warning signal if the potential malfunction is detected. Each step may occur only once, or repeatedly, and the order of the steps may vary.

This method may also be a computer-implemented method. A person of skill in the art will readily recognize that steps of the method may be performed by programmed computers. Embodiments are also intended to cover program storage devices, e.g., digital data storage media, which are machine or computer readable and encode machine-executable or computer-executable programs of instructions, wherein the instructions perform some or all of the acts of the above-described method, when executed on the computer or processor.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature described in one embodiment may also be realized in other embodiments. Such combinations are covered by the disclosure herein, unless it is stated that a specific combination is not intended.

THE LIST OF REFERENCE SIGNS IS AS FOLLOWS

10 pressure sensor data
20 set pressure demand
100 sensor test system
110 pressure setting module
120 detection module
200 electronic parking brake
210 pressure supply connection
213 check valve
215 supply line
218 control line
220 brake actuator
225 pressure chamber
230 parking brake relay valve
241, 242 control valves
251 first pressure sensor
252 second pressure sensor
260 electronic control unit
S110, S120, S130, S140 steps of a method

The invention claimed is:

1. A sensor test system for a pressure sensor in an electronic parking brake (EPB) of a vehicle, the pressure sensor being configured to measure a pressure in a pressure chamber of the EPB, wherein the EPB includes a plurality of valves for setting the pressure, the sensor test system comprising:

a pressure setting module configured to set the pressure based on a deliberate change of the pressure in the pressure chamber, wherein the pressure setting module is configured to deliberately set the pressure in the pressure chamber, using one or more valves of the plurality of valves, to a value that is proportional to a value for releasing a parking brake of the vehicle, but deliberately not sufficient to release the parking brake, wherein the deliberately set value is a pressure demand value set by the pressure setting module to initiate a sensor test of the pressure sensor; and a detection module configured to detect a potential malfunction of the pressure sensor based on a comparison of the pressure demand value set by the pressure setting module with a measured pressure from the pressure sensor, wherein the comparison determines whether the measured pressure from the pressure sensor indicates that the pressure demand value is attained in the pressure chamber, and to issue a warning signal if the potential malfunction of the pressure sensor is detected;

wherein the sensor test system, including the pressure setting module and the detection module, is part of an electronic control unit of the EPB.

2. The sensor test system of claim 1, wherein the pressure setting module is configured to deliberately set the pressure in the pressure chamber to the value that is proportional to the value for releasing the parking brake of the vehicle, but deliberately not sufficient to release the parking brake, when the vehicle is at standstill.

3. The sensor test system of claim 1, wherein the vehicle includes a further brake, and wherein the pressure setting module is configured to apply the further brake, and/or to receive a signal indicating an actuation of the further brake, and/or check that the further brake is applied, while setting the pressure.

4. The sensor test system of claim 1, wherein the pressure setting module is configured to set the pressure in the pressure chamber to at least one of the following:

more than one value in a predetermined sequence, and/or
more than one value in a continuous manner with a specific gradient, and/or
a sequence of values in a periodic manner.

5. The sensor test system of claim 1, wherein the pressure setting module is configured to deliberately set the pressure in the pressure chamber to the value that is proportional to the value for releasing the parking brake of the vehicle, but deliberately not sufficient to release the parking brake depending on a parking and/or driving status of the vehicle.

6. The sensor test system of claim 1, wherein the detection module is configured to trigger the pressure setting module to deliberately set the pressure in the pressure chamber to the value that is proportional to the value for releasing the parking brake of the vehicle, but deliberately not sufficient to release the parking brake.

7. The sensor test system of claim 1, wherein the detection module is configured to detect the potential malfunction of the pressure sensor based on at least one of the following:

a nominal output of the pressure sensor, and/or
a recorded previous output of the pressure sensor, and/or
a supply brake pressure, and/or
a vehicle weight, and/or
a driving or parking status of the vehicle, and/or
a force exerted by a brake of the vehicle, and/or
a motion and/or movement of a brake, and/or a temperature, and/or an air humidity.

8. The sensor test system of claim 1, wherein the detection module is configured to issue the warning signal to at least one of: a driver, and/or surroundings of the vehicle, and/or a further component of the vehicle.

9. A brake unit, comprising:

a pressure chamber; and a pressure sensor to measure, by a sensor test system for the pressure sensor, a pressure in the pressure chamber;

wherein the sensor test system is for the pressure sensor in an electronic parking brake (EPB) of a vehicle, wherein the pressure sensor is configured to measure a pressure in the pressure chamber of the EPB, wherein the EPB includes a plurality of valves for setting the pressure, and wherein the sensor test system includes:

a pressure setting module configured to set the pressure based on a deliberate change of the pressure in the pressure chamber, wherein the pressure setting module is configured to deliberately set the pressure in the pressure chamber, using one or more valves of the plurality of valves, to a value that is proportional to a value for releasing a parking brake of the vehicle, but deliberately not sufficient to release the parking brake, wherein the deliberately set value is a pressure demand value set by the pressure setting module to initiate a sensor test of the pressure sensor; and a detection module configured to detect a potential malfunction of the pressure sensor based on a comparison of the pressure demand value set by the pressure setting module with a measured pressure from the pressure sensor, wherein the comparison determines whether the measured pressure from the pressure sensor indicates that the pressure demand value is attained in the pressure chamber, and to issue a warning signal if the potential malfunction of the pressure sensor is detected;

wherein the sensor test system, including the pressure setting module and the detection module, is part of an electronic control unit of the EPB.

10. A vehicle, comprising:

a brake unit, including:

a pressure chamber; and a pressure sensor to measure, by a sensor test system for the pressure sensor, a pressure in the pressure chamber;

wherein the sensor test system is for the pressure sensor in an electronic parking brake (EPB) of a vehicle, wherein the pressure sensor is configured to measure a pressure in the pressure chamber of the EPB, wherein the EPB includes a plurality of valves for setting the pressure, and wherein the sensor test system includes:

a pressure setting module configured to set the pressure based on a deliberate change of the pressure in the pressure chamber, wherein the pressure setting module is configured to deliberately set the pressure in the pressure chamber, using one or more valves of the plurality of valves, to a value that is proportional to a value for releasing a parking brake of the vehicle, but deliberately not sufficient to release the parking brake, wherein the deliberately set value is a pressure demand value set by the pressure setting module to initiate a sensor test of the pressure sensor; and a detection module configured to detect a potential malfunction of the pressure sensor based on a comparison of the pressure demand value set by the pressure setting module with a measured pressure from the pressure sensor, wherein the comparison determines whether the measured pressure from the pressure sensor indicates that the pressure demand value is attained in the pressure chamber, and to issue a warning signal if the potential malfunction of the pressure sensor is detected;

wherein the sensor test system, including the pressure setting module and the detection module, is part of an electronic control unit of the EPB.

11. A method for testing a pressure sensor in an electronic parking brake (EPB) of a vehicle, the pressure sensor being configured to measure a pressure in a pressure chamber, wherein the EPB includes a plurality of valves for setting the pressure, the method comprising:

deliberately setting the pressure based on a deliberate change of the pressure in the pressure chamber using one or more valves of the plurality of valves, to a value that is proportional to a value for releasing a parking brake of the vehicle, but deliberately not sufficient to release the parking brake, the deliberately set value being a pressure demand value set as part of a sensor test of the pressure sensor;

measuring, by the pressure sensor, the pressure to obtain a measured pressure;

detecting a potential malfunction of the pressure sensor based on a comparison of the pressure demand value with the measured pressure, wherein the comparison determines whether the measured pressure from the pressure sensor indicates that the pressure demand value is attained in the pressure chamber; and issuing a warning signal when the potential malfunction of the pressure sensor is detected.

12. A non-transitory computer readable medium having a computer program, which is executable by a processor, comprising:

a program code arrangement having program code for testing a pressure sensor in an electronic parking brake (EPB) of a vehicle, the pressure sensor being configured to measure a pressure in a pressure chamber, and the EPB including a plurality of valves for setting the pressure, by performing the following:

deliberately setting the pressure based on a deliberate change of the pressure in the pressure chamber using one or more valves of the plurality of valves, to a value that is proportional to a value for releasing a parking brake of the vehicle, but deliberately not sufficient to release the parking brake, the deliberately set value being a pressure demand value set as part of a sensor test of the pressure sensor;

measuring, by the pressure sensor, the pressure to obtain a measured pressure;

detecting a potential malfunction of the pressure sensor based on a comparison of the pressure demand value with the measured pressure, wherein the comparison determines whether the measured pressure from the pressure sensor indicates that the pressure demand value is attained in the pressure chamber; and issuing a warning signal when the potential malfunction of the pressure sensor is detected.

13. The computer readable medium of claim 12, wherein there is a sensor test system for the pressure sensor in the EPB of the vehicle, wherein the pressure sensor is configured to measure the pressure in the pressure chamber of the EPB, and wherein the sensor test system includes:

a pressure setting module configured to set the pressure based on the deliberate change of the pressure in the pressure chamber, wherein the pressure setting module is configured to deliberately set the pressure in the pressure chamber, using the one or more valves of the plurality of valves, to the value that is proportional to the value for releasing a parking brake of the vehicle, but deliberately not sufficient to release the parking brake; and a detection module configured to detect, based on a comparison of the pressure demand value set by the pressure setting module with the measured pressure from the pressure sensor, the potential malfunction of the pressure sensor, and to issue the warning signal when the potential malfunction of the pressure sensor is detected;

wherein the sensor test system, including the pressure setting module and the detection module, is part of an electronic control unit of the EPB.

14. The method of claim 11, wherein there is a sensor test system for the pressure sensor in the EPB of the vehicle, wherein the pressure sensor is configured to measure the pressure in the pressure chamber of the EPB, and wherein the sensor test system includes:

a pressure setting module configured to set the pressure based on the deliberate change of the pressure in the pressure chamber, wherein the pressure setting module is configured to deliberately set the pressure in the pressure chamber, using the one or more valves of the plurality of valves, to the value that is proportional to the value for releasing a parking brake of the vehicle, but deliberately not sufficient to release the parking brake; and a detection module configured to detect, based on a comparison of the pressure demand value set by the pressure setting module with the measured pressure from the pressure sensor, the potential malfunction of the pressure sensor, and to issue the warning signal when the potential malfunction of the pressure sensor is detected;

wherein the sensor test system, including the pressure setting module and the detection module, is part of an electronic control unit of the EPB.

15. The method of claim 11, wherein the deliberate setting of the pressure to the value that is proportional to the value for releasing the parking brake of the vehicle, but deliberately not sufficient to release the parking brake, is performed when the vehicle is at standstill.

16. The method of claim 11, wherein the deliberate setting of the pressure to the value that is proportional to the value for releasing the parking brake of the vehicle, but deliberately not sufficient to release the parking brake, is performed depending on a parking and/or driving status of the vehicle.

17. The method of claim 11, wherein the warning signal is issued, when the potential malfunction is detected, to at least one of: a driver, and/or surroundings of the vehicle, and/or a further component of the vehicle.

18. The method of claim 11, wherein the potential malfunction of the pressure sensor is detected further based on at least one of the following:

a nominal output of the pressure sensor, and/or a recorded previous output of the pressure sensor, and/or a supply brake pressure, and/or a vehicle weight, and/or a driving or parking status of the vehicle, and/or a force exerted by a brake of the vehicle, and/or a motion and/or movement of a brake, and/or a temperature, and/or an air humidity.

19. The sensor test system of claim 1, wherein the pressure setting module is configured to deliberately set the pressure in the pressure chamber to a value which is deliberately insufficient to release the parking brake, during the sensor test of the pressure sensor, by the sensor test system, for the potential malfunction of the pressure sensor.

20. The method of claim 11, wherein the deliberate setting of the pressure, the measuring, the detecting, and the issuing, occur during the testing of the pressure sensor for the potential malfunction of the pressure sensor.

21. The sensor test system of claim 1, wherein the pressure setting module is configured to deliberately open a first control valve and a second control valve individually to increase and then decrease the pressure in the pressure chamber as part of the sensor test of the pressure sensor.

22. The sensor test system of claim 1, wherein the pressure setting module is configured to initiate the sensor test of the pressure sensor in response to a signal for releasing the parking brake reaching the EPB.

23. The sensor test system of claim 1, wherein the pressure setting module is configured to set the pressure in the pressure chamber to the pressure demand value that is deliberately not sufficient to release the parking brake, and subsequently to set the pressure in the pressure chamber to a value sufficient to release the parking brake, after the sensor test of the pressure sensor is completed.

24. The sensor test system of claim 1, wherein the pressure setting module is further configured to set the pressure in the pressure chamber to a full release pressure following the sensor test, and wherein the detection module is further configured to compare the measured pressure from the pressure sensor against a known supply pressure to provide an additional cross-check for the functionality of the pressure sensor.

25. The sensor test system of claim 1, wherein the pressure setting module is configured to set the pressure in the pressure chamber according to a test schedule comprising a two-way change of the pressure followed by at least one of: a pressure change with a specific gradient, or a periodic change of the pressure.

26. The sensor test system of claim 1, wherein an order of opening of the one or more valves, a timing, and a desired pressure change are determined based on an actual output of the pressure sensor.

27. The sensor test system of claim 8, wherein the further component of the vehicle is a planning module of an autonomous driving system, and wherein the warning signal is configured to support the autonomous driving system in operating the vehicle in a restricted mode.

28. The sensor test system of claim 1, wherein the sensor test system is further configured to perform a first sensor test for a first pressure sensor configured to measure a pressure in a control line of the EPB, together with or individually from the sensor test for the pressure sensor configured to measure the pressure in the pressure chamber.

* * * * *